(12) United States Patent
Shanmugam et al.

(10) Patent No.: US 10,304,061 B1
(45) Date of Patent: May 28, 2019

(54) GRAPH-BASED SUPPORT TICKET TRACKING AND RESOLUTION

(71) Applicant: EMC Corporation, Hopkinton, MA (US)

(72) Inventors: Vindhya Shanmugam, Bangalore (IN); Srikanth Tippana, Secunderabad (IN); Ankita Rathi, Bhilwara (IN)

(73) Assignee: EMC IP Holding Company LLC, Hopkinton, MA (US)

(*) Notice: Subject to any disclaimer, the term of this patent is extended or adjusted under 35 U.S.C. 154(b) by 473 days.

(21) Appl. No.: 15/075,920

(22) Filed: Mar. 21, 2016

(51) Int. Cl.
*G06Q 30/00* (2012.01)
*G06F 16/2455* (2019.01)
*G06F 17/30* (2006.01)
*H04L 12/24* (2006.01)
*H04L 29/08* (2006.01)

(52) U.S. Cl.
CPC ....... *G06Q 30/016* (2013.01); *G06F 16/2455* (2019.01)

(58) Field of Classification Search
CPC combination set(s) only.
See application file for complete search history.

(56) References Cited

U.S. PATENT DOCUMENTS 7,093,005 B2 * 8/2006 Patterson ............... G06F 9/5061
709/220
2006/0126801 A1 * 6/2006 Laperi ................... G06Q 10/06
379/32.01

* cited by examiner

*Primary Examiner* — Mark A Fleischer
(74) *Attorney, Agent, or Firm* — Ryan, Mason & Lewis, LLP

(57) ABSTRACT

Generation of a graphical representation for a support ticket tracking system includes assigning nodes in the graphical representation to represent: support ticket identifiers, entities that are involved in resolving support tickets, products involved in support tickets, and features of the products involved in support tickets, and linking the nodes in the graphical representation to generate pattern mappings for the support tickets. For a given support ticket, generation of a pattern mapping includes linking the nodes of the one or more entities involved in resolving the given support ticket, the nodes of the one or more products involved in the given support ticket, and the nodes of the one or more features of the one or more products involved in the given support ticket, to the node of the given support ticket identifier. The nodes are linked in the graphical representation to create a pattern mapping for the given support ticket.

16 Claims, 5 Drawing Sheets

100

200

300

GRAPH-BASED SUPPORT TICKET TRACKING AND RESOLUTION

FIELD

The field relates generally to data processing and, more particularly, to support ticket tracking systems.

BACKGROUND

A support ticket tracking system (also known as an issue tracking system) is a computer-based system that manages and maintains a list of support issues relating to an enterprise. A ticket is a data item that identifies a particular issue. The ticket is created and stored on the computer system or network used to implement the tracking system.

By way of example only, the enterprise may be a hardware and/or software product provider, and support issues may be issues relating to support services (e.g., troubleshooting) that the enterprise provides to its customers (i.e., purchasers of their products) for these products.

Due to the ongoing business relationship between the enterprise and its customers, or perhaps based on a contractual obligation to provide a particular support service level, there is a strong motivation to resolve support issues in the fastest manner possible. However, many times the support issue has to be resolved at the customer premises since that is where the product is installed. Other times, the issue can be resolved by the customer calling into a call center or logging onto a help center managed by the enterprise. In either case, the support ticket tracking system of the enterprise is configured to generate a support ticket when an issue arises, and close out the ticket following resolution of the issue.

SUMMARY

Embodiments of the invention provide an improved support ticket tracking system.

For example, in one embodiment, a support ticket tracking system comprises a memory and a processor coupled to the memory. The system also comprises a graphical representation stored in the memory, wherein generation of the graphical representation comprises assigning nodes in the graphical representation to represent: support ticket identifiers, entities that are involved in resolving support tickets, products involved in support tickets, and features of the products involved in support tickets; and linking the nodes in the graphical representation to generate pattern mappings for the support tickets, wherein for a given support ticket, generation of a pattern mapping comprises linking the nodes of the one or more entities involved in resolving the given support ticket, the nodes of the one or more products involved in the given support ticket, and the nodes of the one or more features of the one or more products involved in the given support ticket, to the node of the given support ticket identifier, such that the nodes are linked in the graphical representation to create a pattern mapping for the given support ticket. The graphical representation is accessed by the processor in the memory for use in resolving one or more subsequent support tickets.

In one or more further embodiments, the processor receives a query for a subsequent support ticket in the support ticket tracking system. In response to the query, the processor searches the graphical representation stored in the memory to identify one or more pattern mappings that match at least part of the subsequent support ticket. The processor returns results describing resolution details of one or more matching pattern mappings identified during the search. The processor also returns a list of recommended entities from the one or more matching pattern mappings to contact to assist in resolving the subsequent support ticket. The recommendations may also identify connections between multiple products, features, entities (e.g., users or individuals with skill sets to resolve an issue) and support issues in order to improve troubleshooting of the issues.

Advantageously, embodiments of the invention allow an enterprise or its customers to more quickly (e.g., in real-time) resolve a new issue by determining if the new issue matches a previous issue such that recommendations can be made for resolving the new issue based on information learned during resolution of the previous issue.

These and other features and advantages of the invention will become more readily apparent from the accompanying drawings and the following detailed description.

DETAILED DESCRIPTION

Illustrative embodiments may be described herein with reference to exemplary cloud infrastructure, data repositories, data centers, data processing systems, computing systems, data storage systems and associated servers, computers, storage units and devices and other processing devices. It is to be appreciated, however, that embodiments of the invention are not restricted to use with the particular illustrative system and device configurations shown. Moreover, the phrases "cloud infrastructure," "data repository," "data center," "data processing system," "computing system," "data storage system," "data lake," and the like as used herein are intended to be broadly construed, so as to encompass, for example, private and/or public cloud computing or storage systems, as well as other types of systems comprising distributed virtual infrastructure. However, a given embodiment may more generally comprise any arrangement of one or more processing devices.

As mentioned above, enterprises typically have to support their products after they are installed at a customer site. Most of the time, issues requiring support from the enterprise are repetitive, i.e., they are of the same or similar nature (problem and resolution) and tend to happen over and over again either at the same customer site or across sites of multiple customers. While tickets are opened for every issue in a support ticket tracking system maintained by the enterprise, it would be helpful to be able to retrieve information faster, especially when an issue has repeated itself, to help the enterprise resolve the new ticket faster.

Embodiments of the invention realize that there is a relation between entities (e.g., product support staff, administrative support staff, product users, etc.) involved in resolving a support ticket, and the product(s) and features involved in the support ticket. By linking this data in a graph and creating a pattern mapping for a ticket, embodiments of the invention are able to then look to this pattern mapping for subsequent, same or similar support issues to resolve these subsequent issues in a faster and more effective manner.

In illustrative embodiments, a graph database system is used to form these links and pattern mappings. More particularly, relationships are created between entities, tickets and products, and these relationships are used in real time for recommending resolutions to subsequent support issues. For example, recommendations can include a list of all related personnel with previous experience working on a similar ticket.

While embodiments of the invention are not limited to any particular graph database platform, one illustrative embodiment adapts Neo4j® which is an open source graph database product available from Neo Technology, Inc. of San Mateo, Calif.

Figure 1:
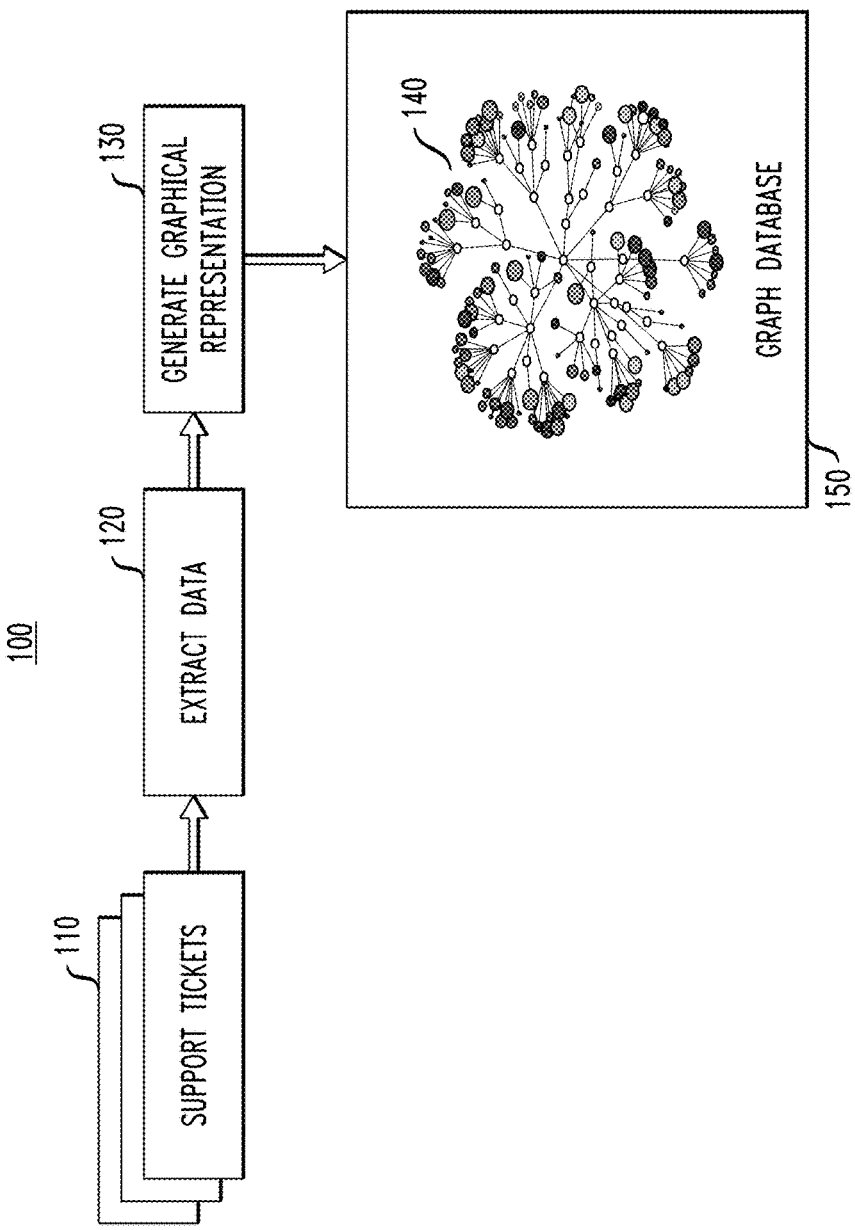
FIG. 1 illustrates generation of a graphical representation in a graph-based support ticket tracking system according to an embodiment of the invention.

FIG. 1 illustrates generation of a graphical representation in a graph-based support ticket tracking system according to an embodiment of the invention. As shown in system 100, a set of one or more support tickets 110 are obtained by the system 100. These support tickets can be for past support issues that have been resolved or that are still in the process of being resolved. Data extraction module 120 receives the one or more support tickets 110 and extracts relevant data including, but not limited to, ticket number identifiers, entities involved in resolutions of the tickets, products and features appearing in the tickets, as well as any relevant properties and attributes associated with each of these data items (e.g., contact email addresses and/or phone numbers, product numbers, product versions, product feature settings, installation details such as locations and dates, etc.).

The extracted data is sent to graphical representation generation module 130 where it is converted to a normalized format and then transformed to a graphical representation 140. For example, in one embodiment, the data can be converted to a comma-separated value (CSV) file for processing before being converted to a graphical representation 140 and stored in graph database 150. The graph database 150 can be accessed by a graph database language (Cypher® for Neo4j®).

Further, in graphical representation generation module 130, the graphical representation 140 is created as follows. Nodes are assigned in the graphical representation 140 to represent: support ticket identifiers, entities that are involved in resolving support tickets, products involved in support tickets, and features of the products involved in support tickets. The nodes are then linked in the graphical representation 140 to generate pattern mappings for the support tickets. Thus, for a given support ticket, generation of a pattern mapping comprises linking the respective nodes of the one or more entities involved in resolving the given support ticket, the respective nodes of the one or more products involved in the given support ticket, and the respective nodes of the one or more features of the one or more products involved in the given support ticket, to the node of the given support ticket identifier. The support ticket identifier node can serve as a root node. The nodes that are linked create a pattern mapping for the given support ticket.

Advantageously, enterprise employees are linked to the tickets, e.g., (user)-[: solved]-(ticket), which is a GraphDB™ representation of which user has resolved which ticket. GraphDB™ (available from Ontotext of Sophia, Bulgaria) is one illustrative graph data modeling tool that can be used to model the graphical representation 140.

Sometimes a ticket traverses multiple groups due to integration within enterprise products, so more than one person can be involved in resolving a ticket. The tickets can therefore be linked to a product group. If the ticket is getting reassigned to a different product group (e.g., from VPLEX product group to VIPR product group) as a result of root causing, all the relations (including the reassignment) are linked together. Then, specific features of the product where the issue was found are linked. This linking of related nodes creates a relationship or a pattern mapping.

It is thus contemplated that for the set of support tickets 110 that a graphical representation 140 includes nodes for each relevant data item extracted and, for each ticket, related nodes are connected to form a pattern mapping. Thus, the graphical representation 140 will likely have multiple pattern mappings, one for each ticket, where some nodes are unique to one pattern mapping while others are linked to more than one pattern mapping.

Figure 2:
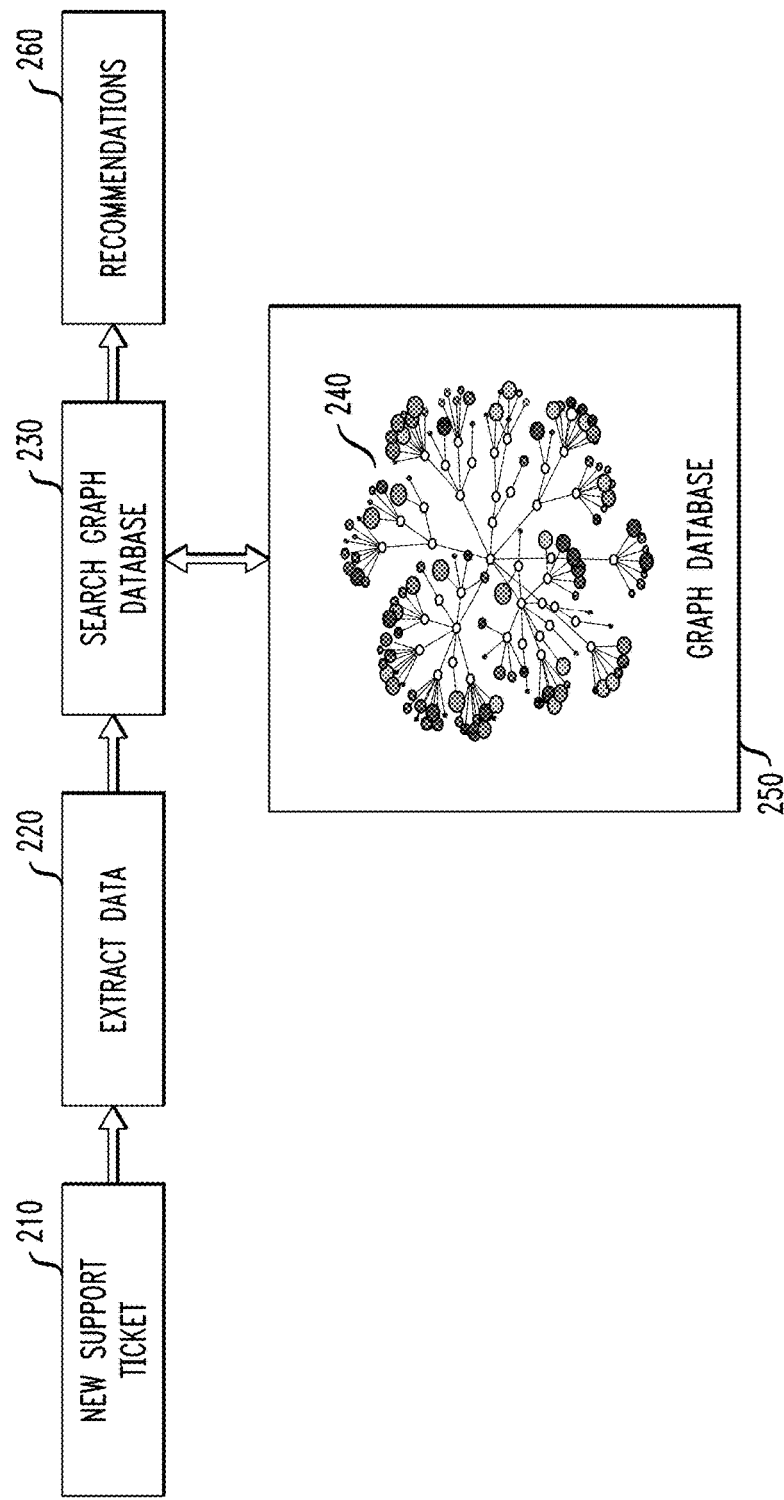
FIG. 2 illustrates querying of a graphical representation in a graph-based support ticket tracking system according to an embodiment of the invention.

FIG. 2 illustrates querying of a graphical representation in a graph-based support ticket tracking system according to an embodiment of the invention. As shown in system 200, a new support ticket 210 is obtained by the system 200. Relevant data is extracted from the ticket by extraction module 220 in the same way as the extraction operations of module 120 (FIG. 1). The extracted data is used as search terms by search module 230 to identify one or more pattern mappings in graphical representation 240, stored in graph database 250 (note that 240 and 250 are the same as 140 and 150, respectively, in FIG. 1), that match the search terms. The search module 230 then generates recommendations 260 based on the identified pattern mappings. As mentioned above, such recommendations may include, but are not limited to, providing contact information for a person previously involved with resolving the support ticket of one of the identified pattern mappings. The recommendation could also provide a ranked list of persons to contact. The presumption being that the listed person would be able to help resolve the issue associated with the new ticket 210 more quickly and effectively. Still further, the recommendations may include information on product sequences based on identified past products and sequencing involved in ticket resolution. Again, where the graph database 250 is Neo4j®, the Cypher® language can be used to query the database 250 based on the extracted data items from the new ticket 210.

In an illustrative embodiment, an open source web user interface could be created using Bootstrap (licensed through Massachusetts Institute of Technology) through which to submit new tickets for search. The search function can be offered as a micro-service through a representational state transfer (REST) application programming interface (API), so that the function can be consumed by other services and other application programs, e.g., requested by a client device with a server storing the graph database and handling the query and search functions.

Figure 3:
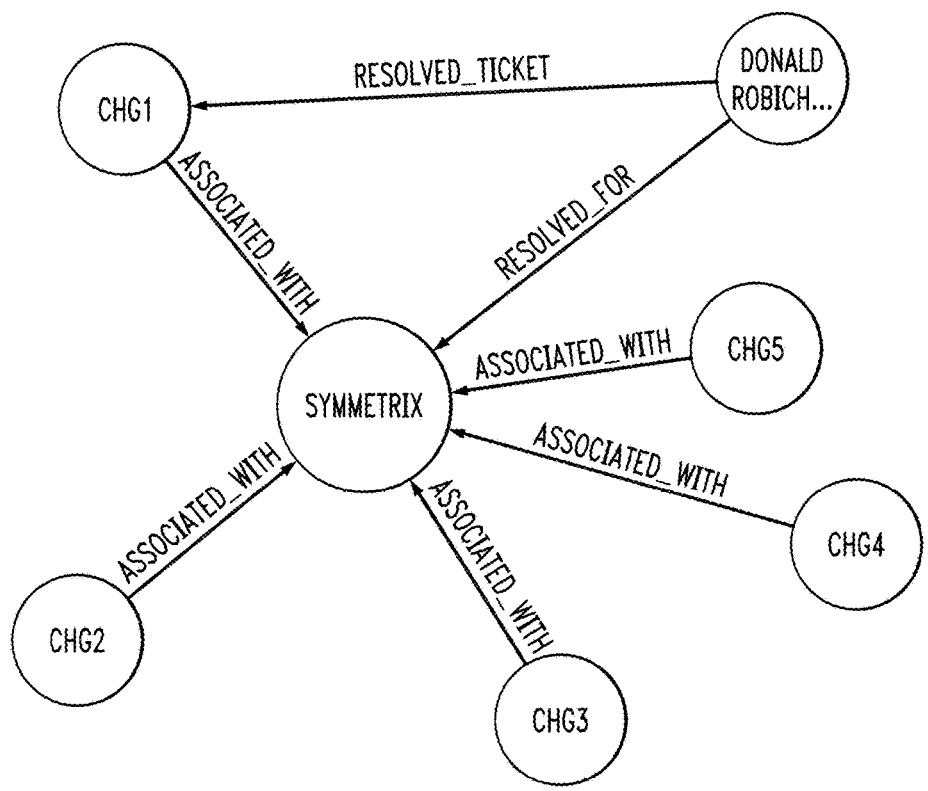
FIG. 3 illustrates an example of a portion of a graphical representation according to an embodiment of the invention.

FIG. 3 illustrates an example of a portion of a graphical representation according to an embodiment of the invention. As shown, a portion 300 of a graphical representation comprises nodes that identify a product involved in the support ticket issue (e.g., Symmetrix), a person involved in resolution of support issues (e.g., Donald Robich), and several different ticket number nodes (CHG1, . . . , CHG5) connected to the same product. Thus, for each ticket, a pattern mapping includes the same product and person nodes thereby leading the system to generate a recommendation that that the person identified in the pattern, Donald Robich, be contacted when a new ticket comes in regarding the Symmetrix product.

Figure 4:
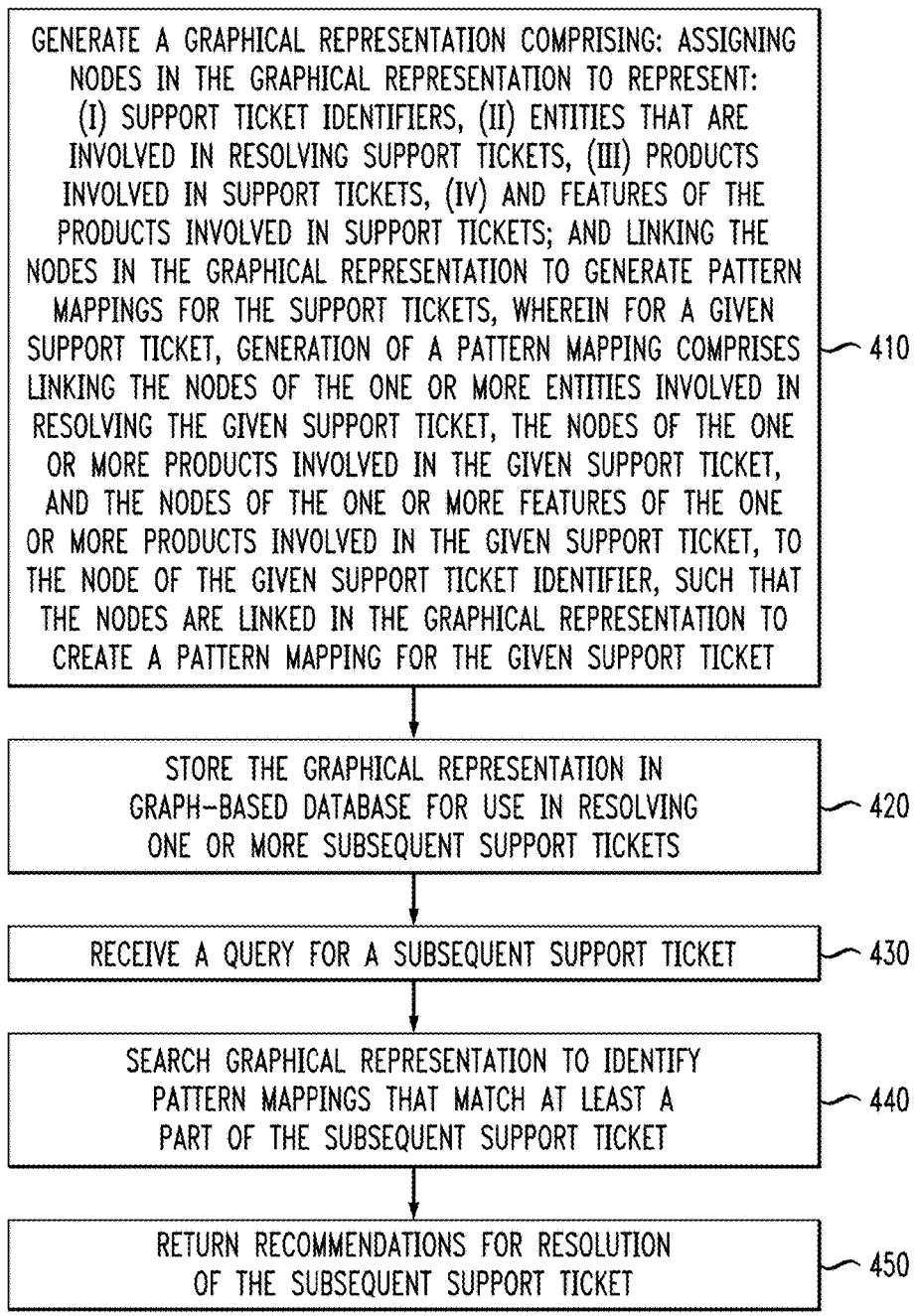
FIG. 4 illustrates a graph-based support ticket tracking and resolution methodology according to an embodiment of the invention.

FIG. 4 illustrates a graph-based support ticket tracking and resolution methodology 400 according to an embodiment of the invention. More particularly, methodology 400 summarizes the tracking and resolution steps described above.

In particular, step 410 generates a graphical representation comprising: assigning nodes in the graphical representation to represent: (i) support ticket identifiers, (ii) entities that are involved in resolving support tickets, (iii) products involved in support tickets, and (iv) features of the products involved in support tickets; and linking the nodes in the graphical representation to generate pattern mappings for the support tickets. Thus, for a given support ticket, generation of a pattern mapping comprises linking the nodes of the one or more entities involved in resolving the given support ticket, the nodes of the one or more products involved in the given support ticket, and the nodes of the one or more features of the one or more products involved in the given support ticket, to the node of the given support ticket identifier, such that the nodes are linked in the graphical representation to create a pattern mapping for the given support ticket.

Step 420 stores the graphical representation in a graph-based database for use in resolving one or more subsequent support tickets.

Further, step 430 receives a query for a subsequent support ticket.

Step 440 searches graphical representation to identify pattern mappings that match at least a part of the subsequent support ticket.

Lastly, step 450 returns recommendations for resolution of the subsequent support ticket.

Figure 5:
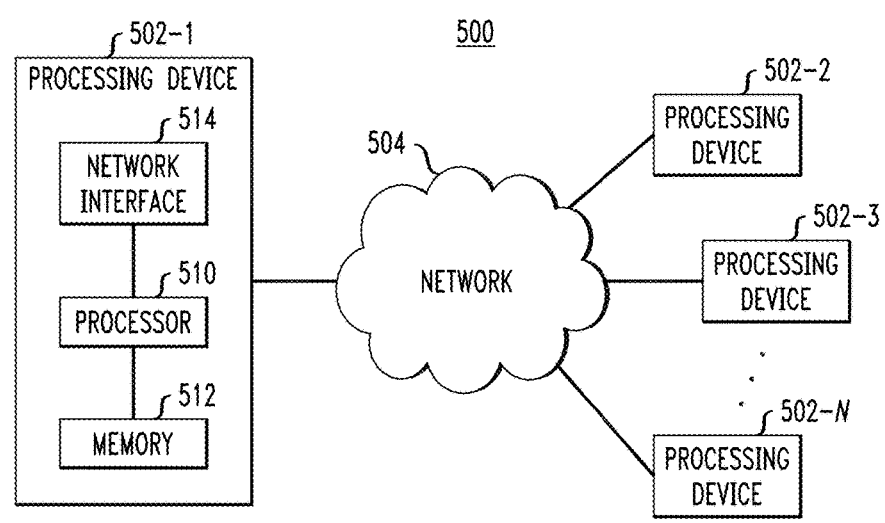
FIG. 5 illustrates a processing platform used to implement a graph-based support ticket tracking system according to an embodiment of the invention.

As an example of a processing platform on which a graph-based support ticket tracking system (e.g., including 100 of FIG. 1, and 200 of FIG. 2) according to illustrative embodiments can be implemented is processing platform 500 shown in FIG. 5. The processing platform 500 in this embodiment comprises a plurality of processing devices, denoted 502-1, 502-2, 502-3, . . . 502-N, which communicate with one another over a network 504. It is to be appreciated that the data valuation methodologies described herein may be executed in one such processing device 502, or executed in a distributed manner across two or more such processing devices 502. The cloud infrastructure environment may also be executed in a distributed manner across two or more such processing devices 502. The various functionalities described herein may be executed on the same processing devices, separate processing devices, or some combination of separate and the same (overlapping) processing devices. It is to be further appreciated that a server, a client device, a computing device or any other processing platform element may be viewed as an example of what is more generally referred to herein as a "processing device." As illustrated in FIG. 5, such a device generally comprises at least one processor and an associated memory, and implements one or more functional modules for instantiating and/or controlling features of systems and methodologies described herein. Multiple elements or modules may be implemented by a single processing device in a given embodiment.

The processing device 502-1 in the processing platform 500 comprises a processor 510 coupled to a memory 512. The processor 510 may comprise a microprocessor, a microcontroller, an application-specific integrated circuit (ASIC), a field programmable gate array (FPGA) or other type of processing circuitry, as well as portions or combinations of such circuitry elements. Components of systems as disclosed herein can be implemented at least in part in the form of one or more software programs stored in memory and executed by a processor of a processing device such as processor 510. Memory 512 (or other storage device) having such program code embodied therein is an example of what is more generally referred to herein as a processor-readable storage medium. Articles of manufacture comprising such processor-readable storage media are considered embodiments of the invention. A given such article of manufacture may comprise, for example, a storage device such as a storage disk, a storage array or an integrated circuit containing memory. The term "article of manufacture" as used herein should be understood to exclude transitory, propagating signals.

Furthermore, memory 512 may comprise electronic memory such as random access memory (RAM), read-only memory (ROM) or other types of memory, in any combination. The one or more software programs when executed by a processing device such as the processing device 502-1 causes the device to perform functions associated with one or more of the components/steps of system/methodologies in FIGS. 1-4. One skilled in the art would be readily able to implement such software given the teachings provided herein. Other examples of processor-readable storage media embodying embodiments of the invention may include, for example, optical or magnetic disks.

Processing device 502-1 also includes network interface circuitry 514, which is used to interface the device with the network 504 and other system components. Such circuitry may comprise conventional transceivers of a type well known in the art.

The other processing devices 502 (502-2, 502-3, . . . 502-N) of the processing platform 500 are assumed to be configured in a manner similar to that shown for computing device 502-1 in the figure.

The processing platform 500 shown in FIG. 5 may comprise additional known components such as batch processing systems, parallel processing systems, physical machines, virtual machines, virtual switches, storage volumes, etc. Again, the particular processing platform shown in this figure is presented by way of example only, and the data valuation system and cloud infrastructure described herein may include additional or alternative processing platforms, as well as numerous distinct processing platforms in any combination.

Also, numerous other arrangements of servers, clients, computers, storage devices or other components are possible in processing platform 500. Such components can communicate with other elements of the processing platform 500 over any type of network, such as a wide area network (WAN), a local area network (LAN), a satellite network, a telephone or cable network, or various portions or combinations of these and other types of networks.

Furthermore, it is to be appreciated that the processing platform 500 of FIG. 5 can comprise virtual machines (VMs) implemented using a hypervisor. A hypervisor is an example of what is more generally referred to herein as "virtualization infrastructure." The hypervisor runs on physical infrastructure. As such, the techniques illustratively described herein can be provided in accordance with one or more cloud services. The cloud services thus run on respective ones of the virtual machines under the control of the hypervisor. Processing platform 500 may also include multiple hypervisors, each running on its own physical infrastructure. Portions of that physical infrastructure might be virtualized.

As is known, virtual machines are logical processing elements that may be instantiated on one or more physical processing elements (e.g., servers, computers, processing devices). That is, a "virtual machine" generally refers to a software implementation of a machine (i.e., a computer) that executes programs like a physical machine. Thus, different virtual machines can run different operating systems and multiple applications on the same physical computer. Virtualization is implemented by the hypervisor which is directly inserted on top of the computer hardware in order to allocate hardware resources of the physical computer dynamically and transparently. The hypervisor affords the ability for multiple operating systems to run concurrently on a single physical computer and share hardware resources with each other.

An example of a commercially available hypervisor platform that may be used to implement portions of the processing platform 500 in one or more embodiments of the invention is the VMware vSphere (VMware Inc. of Palo Alto, Calif.) which may have an associated virtual infrastructure management system such as the VMware vCenter. The underlying physical infrastructure may comprise one or more distributed processing platforms that include storage products such as VNX and Symmetrix VMAX (both available from EMC Corporation of Hopkinton, Mass.). A variety of other computing and storage products may be utilized to implement the one or more cloud services that provide the functionality and features described herein.

It was noted above that portions of the data valuation system and cloud environment may be implemented using one or more processing platforms. A given such processing platform comprises at least one processing device comprising a processor coupled to a memory, and the processing device may be implemented at least in part utilizing one or more virtual machines, containers or other virtualization infrastructure. By way of example, such containers may be Docker containers or other types of containers.

It should again be emphasized that the above-described embodiments of the invention are presented for purposes of illustration only. Many variations may be made in the particular arrangements shown. For example, although described in the context of particular system and device configurations, the techniques are applicable to a wide variety of other types of data processing systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method, comprising:
generating a graphical representation in a support ticket tracking system, wherein generation of the graphical representation comprises:
assigning nodes in the graphical representation to represent: support ticket identifiers, entities that are involved in resolving support tickets, products involved in support tickets, and features of the products involved in support tickets; and
linking the nodes in the graphical representation to generate pattern mappings for the support tickets, wherein for a given support ticket, generation of a pattern mapping comprises linking the nodes of the one or more entities involved in resolving the given support ticket, the nodes of the one or more products involved in the given support ticket, and the nodes of the one or more features of the one or more products involved in the given support ticket, to the node of the given support ticket identifier, such that the nodes are linked in the graphical representation to create a pattern mapping for the given support ticket; and
storing the graphical representation for use in resolving one or more subsequent support tickets;
providing a user interface which enables a user via a computing device to submit a query for a subsequent support ticket in the support ticket tracking system;
receiving the query for the subsequent support ticket in the support ticket tracking system;
extracting, from the subsequent support ticket, data representing one or more parameters of the subsequent support ticket;
in response to the query, using the extracted data as one or more search terms, searching the graphical representation to identify one or more pattern mappings that match the one or more search terms; and
generating and returning to the user via the computing device one or more recommendations for resolving the subsequent support ticket based on the identified one or more pattern mappings;
wherein the steps of the method are implemented via a processing device comprising a processor coupled to a memory.

2. The method of claim 1, wherein the one or more recommendations for resolving the subsequent support ticket comprise results describing resolution details of one or more matching pattern mappings identified during the searching step.

3. The method of claim 1, wherein the one or more recommendations for resolving the subsequent support ticket comprise a list of recommended entities from the one or more matching pattern mappings to contact to assist in resolving the subsequent support ticket.

4. The method of claim 1, wherein the graphical representation generating step further comprises extracting, from one or more previous support tickets, data representing the support ticket identifiers, the entities in the enterprise that were involved in resolving the previous support tickets, the products of the enterprise involved in the previous support tickets, and the features of the products involved in the previous support tickets.

5. The method of claim 4, wherein the extracted data is used to assign nodes and link nodes in the graphical representation.

6. The method of claim 1, wherein the graphical representation is stored as a data model in a graph-based database.

7. The method of claim 6, wherein the graph-based database is configured to receive one or more real-time queries.

8. The method of claim 7, wherein the one or more real-time queries are entered via the user interface, wherein the user interface comprises an open source web user interface.

9. The method of claim 8, wherein the graphical representation and the ability to enter the one or more real-time queries are accessible as a service.

10. A support ticket tracking system, comprising:
a memory; and
a processor coupled to the memory; and a graphical representation stored in the memory, wherein generation of the graphical representation comprises assigning nodes in the graphical representation to represent: support ticket identifiers, entities that are involved in resolving support tickets, products involved in support tickets, and features of the products involved in support tickets; and linking the nodes in the graphical representation to generate pattern mappings for the support tickets, wherein for a given support ticket, generation of a pattern mapping comprises linking the nodes of the one or more entities involved in resolving the given support ticket, the nodes of the one or more products involved in the given support ticket, and the nodes of the one or more features of the one or more products involved in the given support ticket, to the node of the given support ticket identifier, such that the nodes are linked in the graphical representation to create a pattern mapping for the given support ticket;

wherein the graphical representation is accessed by the processor in the memory for use in resolving one or more subsequent support tickets;

wherein the support ticket tracking system further comprises a user interface which enables a user via a computing device to submit a query for a subsequent support ticket in the support ticket tracking system; and wherein the processor:
  receives the query for the subsequent support ticket in the support ticket tracking system;
  extracts, from the subsequent support ticket, data representing one or more parameters of the subsequent support ticket;
  in response to the query, using the extracted data as one or more search terms, searches the graphical representation to identify one or more pattern mappings that match the one or more search terms; and
  generates and returns to the user via the computing device one or more recommendations for resolving the subsequent support ticket based on the identified one or more pattern mappings.

11. The system of claim 10, wherein the one or more recommendations for resolving the subsequent support ticket comprise results describing resolution details of one or more matching pattern mappings identified during the search.

12. The system of claim 10, wherein the one or more recommendations for resolving the subsequent support ticket comprise a list of recommended entities from the one or more matching pattern mappings to contact to assist in resolving the subsequent support ticket.

13. The system of claim 10, wherein generation of the graphical representation further comprises extracting, from one or more previous support tickets, data representing the support ticket identifiers, the entities in the enterprise that were involved in resolving the previous support tickets, the products of the enterprise involved in the previous support tickets, and the features of the products involved in the previous support tickets.

14. The system of claim 13, wherein the extracted data is used to assign nodes and link nodes in the graphical representation.

15. The system of claim 10, wherein the graphical representation is stored as a data model in a graph-based database.

16. An article of manufacture comprising a processor-readable storage medium having encoded therein executable code of one or more software programs, wherein the one or more software programs when executed by one or more processing devices implement the steps of:
  generating a graphical representation in a support ticket tracking system, wherein generation of the graphical representation comprises:
    assigning nodes in the graphical representation to represent: support ticket identifiers, entities that are involved in resolving support tickets, products involved in support tickets, and features of the products involved in support tickets; and
    linking the nodes in the graphical representation to generate pattern mappings for the support tickets, wherein for a given support ticket, generation of a pattern mapping comprises linking the nodes of the one or more entities involved in resolving the given support ticket, the nodes of the one or more products involved in the given support ticket, and the nodes of the one or more features of the one or more products involved in the given support ticket, to the node of the given support ticket identifier, such that the nodes are linked in the graphical representation to create a pattern mapping for the given support ticket; and
  storing the graphical representation for use in resolving one or more subsequent support tickets;
  providing a user interface which enables a user via a computing device to submit a query for a subsequent support ticket in the support ticket tracking system;
  receiving the query for the subsequent support ticket in the support ticket tracking system;
  extracting, from the subsequent support ticket, data representing one or more parameters of the subsequent support ticket;
  in response to the query, using the extracted data as one or more search terms, searching the graphical representation to identify one or more pattern mappings that match the one or more search terms; and
  generating and returning to the user via the computing device one or more recommendations for resolving the subsequent support ticket based on the identified one or more pattern mappings.

* * * * *